Patented May 8, 1951

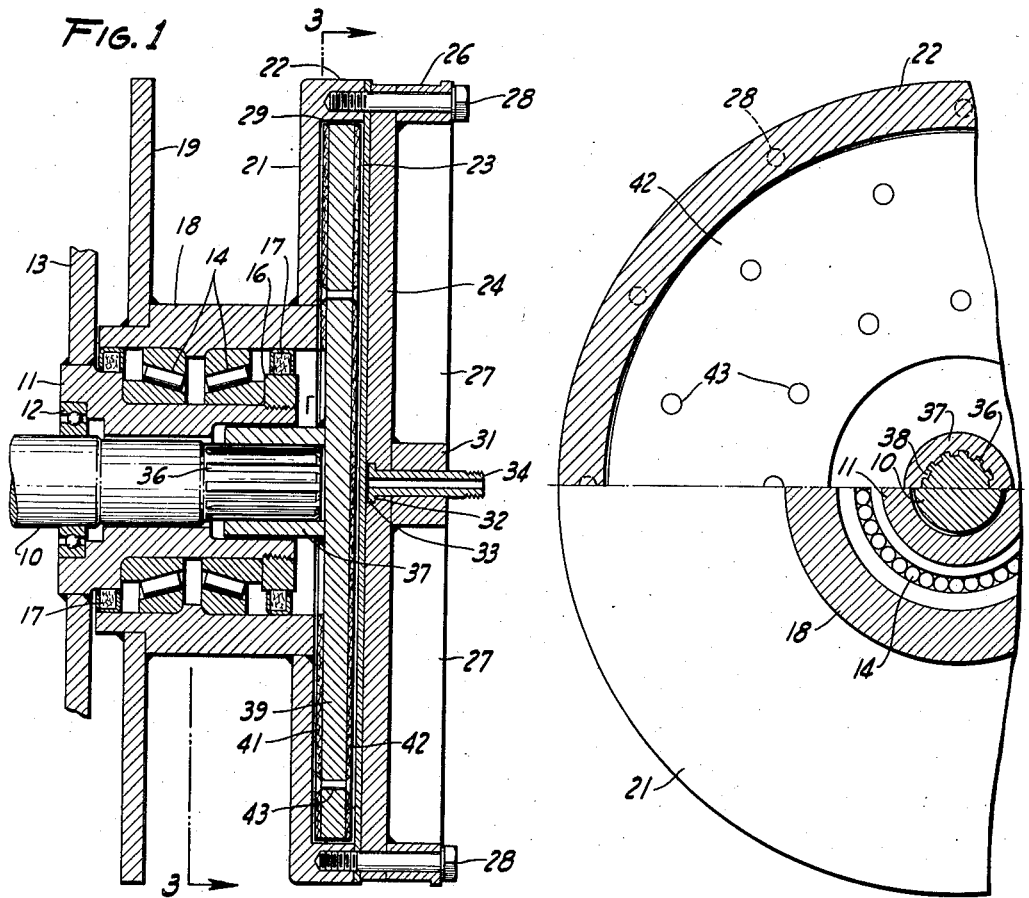
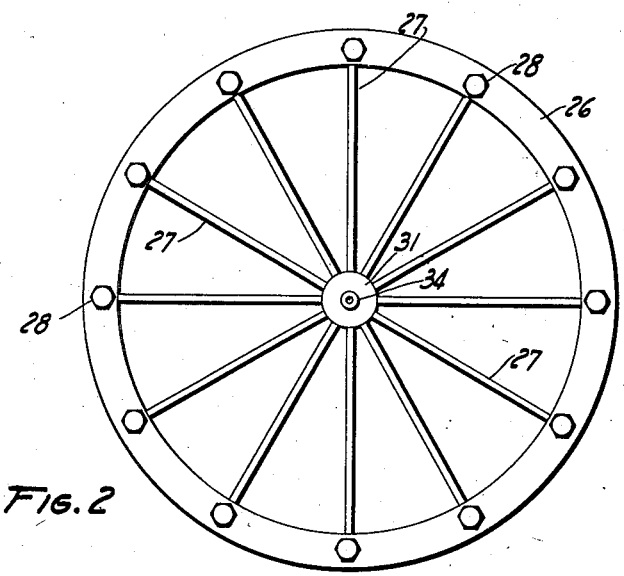

2,551,761

UNITED STATES PATENT OFFICE 2,551,761

FLUID OPERATED CLUTCH

Oscar R. Peterson, Longview, Tex.

Application April 26, 1946, Serial No. 665,167

1 Claim. (Cl. 192—88)

The present invention relates to friction clutches and, more particularly, to clutches that are actuated by fluid pressure for effecting frictional engagement of one or more sets of opposed, independently rotatable, plate surfaces.

Clutches of the various types hitherto in general service, while efficient, require a high degree of skill for the repair or replacement of worn parts. To replace worn faces ordinarily involves pulling bearings or performing intricate shimming operations. Furthermore, careful alignment of all the elements is usually a prerequisite to satisfactory clutch operation.

One of the principal objects of my invention is to provide an efficient, rugged clutch that may be disassembled for replacement of worn parts by the simplest of operations requiring a minimum of time and of skill.

Another object of the invention is to provide a self-adjusting clutch unit that will automatically align its cooperating parts when assembled.

Another object of the invention is to provide a full-floating clutch in which the torque transmitting or torque receiving member floats axially on one end of its driving or driven shaft and may be removed from the shaft without the necessity for severing any mechanical connections or releasing any mechanical retaining elements.

Still another object of the invention is to provide a clutch construction in which the frictional engagement of one or more sets of opposed, independently rotatable, plate surfaces is effected by the flexing of a single metal disk in response to the application of fluid pressure thereto, and in which all parts subject to substantial wear may be pulled out of the assembly after removing only a single set of readily accessible bolts or similar fastening elements.

In general, it is an object of the invention to provide an improved clutch of the type disclosed in the copending application of Oscar R. Peterson et al., Serial No. 629,341, filed November 19, 1945, and particularly to impart greater flexibility, durability, and simplicity thereto while retaining all of the special advantages inherent in the general design features embodied therein.

The details of the invention and the manner in which the foregoing objects and advantages are achieved thereby will be readily understood from the following description of a preferred embodiment thereof, selected for purposes of illustration and shown in the accompanying drawing, in which:

Fig. 1 is a sectional view taken along a plane containing the axial center line of a clutch embodying the present invention;

Fig. 2 is an elevational view on a somewhat smaller scale of one end of the clutch shown in Fig. 1; and Fig. 3 is a fragmentary sectional view of the clutch shown in Fig. 1, the planes of the section being indicated by the line 3—3 in that figure.

The embodiment of the invention shown in the drawings is one adapted to be employed for controlling the operation of a winch for a tractor or the like, in a manner fully explained in another copending application of Oscar R. Peterson et al., Serial No. 532,099, filed April 21, 1944, for a Cable Winch, which matured as Patent No. 2,442,510 on June 1, 1948. Referring to Fig. 1 of the drawing in the instant application, a power shaft 10 projects axially into a stationary, cylindrical bearing support 11 and is mounted for free rotation therein, the shaft being journalled in the bearing support by a race of ball bearings 12, and the bearing support being rigidly secured to a wall 13 of a gear box, or the like, in which the shaft 10 is driven, as by a suitable gear train (not shown). Around its exterior surface, the bearing support 11 carries two sets of opposed, tapered roller bearings 14 held in place by a locking ring 16 that is threaded onto one end of the bearing support. Any suitable type of grease retaining rings 17 may be disposed around the bearing support adjacent opposite ends thereof to assist in maintaining proper lubrication of the bearings 14.

A winch drum 18 encompasses the bearings 14 and is mounted for free rotation thereon with respect to the bearing support 11 and the power shaft 10, the drum being provided with one, plain, annular cheek 19 and an oppositely disposed annular cheek 21 having an integral, peripheral flange 22. A thin disk 23 of spring steel, or other suitably stiff but resilient material, is disposed with its entire outer margin clamped between the flange 22 of the drum cheek 21 and a centrally apertured, relatively thick and rigid disk 24. The rigid disk 24 is provided with a peripheral flange 26 and a plurality of radially extending stiffening ribs or vanes 27 and is secured in place against the resilient disk 23 by a series of peripherally arranged bolts 28 that pass through the flange portion of the rigid disk 24, through the resilient disk 23, and into appropriately tapped apertures in the flange 22 of the drum cheek 21. The outer margins of the resilient disk 23 and the rigid disk 24 must be in tightly sealed contact around their entire peripheries so as to prevent air under relatively high pressure from leaking therebetween, and a suitable sealing compound (not shown) may be employed between the margins of these disks to assist the bolts 28 in maintaining such sealed contact. With the described arrangement of parts, a casing is formed that defines a short, cylindrical chamber 29 between the drum cheek 21 and the resilient disk 23, encompassed by the peripheral flange 22 of the drum cheek 21.

On the side of the rigid disk 24 on which the vanes 27 are mounted is a centrally disposed, cylindrical hub 31 registering with the central aperture in this disk. Inside the chamber 29, the central aperture in the disk 24 is enlarged to provide a seat 32 for a terminal flange 33 of a bushing 34, and the bushing passes outwardly through the rigid disk 24 and its hub 31 with a free fit permitting rotation of the disk 24 and hub 31 with respect to the bushing. The bushing 34 forms the terminus of a fluid conduit (not otherwise shown) through which fluid under pressure may be pumped and caused to flow into the clutch casing between the resilient disk 23 and the rigid disk 24 to flex the former and force it away from the latter, for a purpose described hereinafter.

The shaft 10 preferably extends into the chamber 29 only a short distance beyond the bearing support 11, and this end of the shaft is provided with a series of circumferentially spaced, axially extending external splines 36. A hub 37, provided with complementary internal splines 38, is mounted on the shaft 10 so that it floats axially thereon but is constrained by the complementary sets of splines 36 and 38 to rotate with the shaft. A relatively thick, rigid disk 39 is suitably mounted on the hub 37 and is disposed within the chamber 29 for rotation therein when driven by the power shaft 10. The diameter of the disk 39 is preferably only slightly less than the diameter of the cylindrical chamber 29 and is provided with an annular plate 41 of clutch lining material secured to one face thereof and a disk 42 of clutch lining material secured to its opposite face as by rivets 43. The combined thickness of the disk 39 and the two layers of clutch lining material secured thereto is preferably only slightly less than the marginal separation of the drum cheek 21 and the resilient disk 23, which dimension is defined by the flange 22 of the former.

Under normal operating conditions, the power shaft 10 is continuously driven, whereby continuous rotation of the floating disk 39 within the chamber 29 is maintained. By forcing a suitable fluid, such as air, under pressure through the bushing 34, the fluid may be caused to spread radially between the resilient disk 23 and the rigid disk 24, thereby flexing the former and causing it to separate from the latter. When flexed in this manner, the resilient disk 23 is caused to bear forcibly against the adjacent surface lining 42 of the floating disk 39, which causes the floating disk to move toward the adjacent drum cheek 21 and bring the surface lining 41 forcibly into face contact therewith. Such frictional engagement of the surface linings of the floating disk 39 with the opposite end walls of the chamber 29 causes the casing defining the chamber 29 to rotate with the floating disk, thereby effecting a corresponding rotation of the winch drum 18.

As explained and illustrated in detail in the first application of Oscar R. Peterson et al. mentioned above, Serial No. 629,341, a relatively low initial pressure in the fluid supply line causes the resilient disk 23 to bow away from the rigid disk 24 only adjacent its center, the bowing extending progressively radially outwardly in all directions as the fluid pressure is increased. Thus, by gradually increasing the pressure in the fluid supply line, the area of contact between the resilient disk 23 and the adjacent surface lining 42 of the floating disk 39 may be similarly radially expanded, and the torque applied to the winch drum 18 may be gradually increased thereby with very sensitive control and extremely smooth application of power. Since operating conditions often demand a preliminary, light, driving torque and a slow drum speed to permit adjustments to be made in the load hitch or rig, such sensitivity of control and smooth application of power are highly advantageous.

With the present invention, the initial area of frictional engagement of the resilient disk 23 with the surface lining 42 of the floating disk 39 occurs over a small area at the very center of rotation thereof, whereas, with the devices illustrated in the Peterson et al. application, Serial No. 532,099, the initial area of frictional contact is a narrow annulus of substantially greater diameter. From this it will be readily apparent that the present invention permits even more sensitive control and smooth application of power than the other devices mentioned.

A further advantage of the present invention over those other devices resides in the mounting of the fluid supply bushing 34 in the relatively thick, rigid disk 24 instead of in the thin, resilient disk 23. The rigid disk 24 is not subjected to such wear that its periodical replacement is required, and replacement of the resilient disk 23 does not involve as costly or as complicated a substitution of parts as when the fluid supply bushing is secured directly thereto.

From an observation of Figs. 1 and 2, it can be seen that the mere removal of the bolts 28 permits the rigid disk 24 and the resilient disk 23 to be dropped off the assembly, thereby giving ready access to the floating disk 39, which may then be bodily withdrawn without severing any other mechanical connections. Only the resilient disk 23 and the surface linings 41 and 42 on the floating disk 39 are subject to substantial wear in operation, the most rapid wear being only on the linings 41 and 42, and these relatively simple and inexpensive parts may readily be replaced. Furthermore, reassembly of the clutch in the course of such replacement requires no adjustments by a service man, for the floating disk 39 is self-centering in the cylindrical chamber 29. When the installation of new surface linings on the floating disk 39 is required, this operation may be performed with the simplest of tools, since both of the surface linings are mounted on exposed, flat surfaces of the readily removable floating disk.

From the foregoing description, it will be appreciated that I have provided an improved, fluid actuated, friction clutch of extremely simple design that is efficient and flexible in operation, extremely rugged, and adapted to be serviced with a minimum of effort, skill, and time required. While a single preferred embodiment of the invention particularly adapted for use in connection with a specified type of machine has been disclosed in detail, it will be understood that the invention is susceptible to many other uses in practice and to many variations in its structural design. Consequently, the scope of the invention is not to be limited to the particular use or structural design illustrated, except as may be required by the appended claim.

I claim:

A friction clutch for transmitting power from a rotating shaft in smooth gradations and at all speeds from zero up to the speed of said shaft, said clutch including an annular stationary bearing support; a drive shaft rotatable therein; an annular member to be driven encircling said bearing support and rotatable thereon, said member having an annular plate at one end with an axially projecting peripheral flange; a rigid closure disk secured to said flange so as to enclose a pocket between it and said annular plate; a relatively thin resilient disk between said closure disk and said flange and sealed to said closure disk around its periphery; a relatively rigid disk freely floating axially on one end of said drive shaft and constrained to rotate therewith inside said pocket between said resilient disk and said annular plate; and means to introduce fluid under pressure between said closure disk and said resilient disk, so that said resilient disk is forced outwardly against said floating disk and said floating disk is then moved against said annular member, the area of contact between said resilient disk and said floating disk being increased with increase in fluid pressure.

OSCAR R. PETERSON.

REFERENCES CITED

The following references are of record in the file of this patent:

UNITED STATES PATENTS

| Number | Name | Date |
|---|---|---|
| 427,085 | Jones | May 6, 1890 |
| 517,679 | Byers | Apr. 3, 1894 |
| 818,828 | Kasson | Apr. 24, 1906 |
| 848,379 | Lake | Mar. 26, 1907 |
| 877,437 | King | Jan. 21, 1908 |
| 1,543,888 | Wickes | June 30, 1925 |
| 1,831,083 | Stock | Nov. 10, 1931 |
| 2,122,067 | Kress | June 28, 1938 |
| 2,138,393 | Wichtendahl | Nov. 29, 1938 |
| 2,307,456 | Fawick | Jan. 5, 1943 |
| 2,442,510 | Peterson et al. | June 1, 1948 |